(12) United States Patent
Lee et al.

(10) Patent No.: US 10,028,264 B2
(45) Date of Patent: Jul. 17, 2018

(54) METHOD FOR TRANSMITTING AND RECEIVING CONTROL INFORMATION FOR DEVICE-TO-DEVICE (D2D) COMMUNICATION IN WIRELESS COMMUNICATION SYSTEM AND APPARATUS THEREFOR

(71) Applicant: LG ELECTRONICS INC., Seoul (KR)

(72) Inventors: Seungmin Lee, Seoul (KR); Hanbyul Seo, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 15/032,915

(22) PCT Filed: Oct. 30, 2014

(86) PCT No.: PCT/KR2014/010287
§ 371 (c)(1),
(2) Date: Apr. 28, 2016

(87) PCT Pub. No.: WO2015/065061
PCT Pub. Date: May 7, 2015

(65) Prior Publication Data
US 2016/0278053 A1    Sep. 22, 2016

Related U.S. Application Data

(60) Provisional application No. 61/897,821, filed on Oct. 30, 2013.

(51) Int. Cl.
*H04W 4/08*    (2009.01)
*H04W 72/04*    (2009.01)
(Continued)

(52) U.S. Cl.
CPC ............ *H04W 72/042* (2013.01); *H04B 7/26* (2013.01); *H04L 5/00* (2013.01); *H04W 8/005* (2013.01); *H04W 72/04* (2013.01); *H04W 72/12* (2013.01)

(58) Field of Classification Search
CPC ... H04W 72/042; H04W 8/005; H04W 72/12; H04W 72/04; H04L 5/00; H04B 7/26
See application file for complete search history.

(56) References Cited

U.S. PATENT DOCUMENTS 9,642,172 B2*    5/2017   Yamazaki ............ H04W 76/021
2013/0223356 A1*  8/2013   Khoshnevis ........ H04W 72/042
                                                       370/329
(Continued)

FOREIGN PATENT DOCUMENTS

WO    WO 2012/129806 A1    10/2012
WO    WO 2013/109040 A1     7/2013
WO    WO 2013/139041 A1     9/2013

*Primary Examiner* — Phuc Tran
(74) *Attorney, Agent, or Firm* — Birch, Stewart, Kolasch & Birch, LLP

(57) ABSTRACT

The present invention relates to a method and an apparatus for receiving control information of a terminal for device-to-device (D2D) ProSe in a wireless communication system. Specifically, the method comprises the steps of: receiving information on radio resources which are semi-statically configured for device-to-device proximity service (D2D ProSe); and receiving downlink control information (DCI) indicating whether or not D2D ProSe is activated on a specific radio resource of the radio resources, wherein the downlink control information is available only in a search procedure in which a resource for transmitting a terminal-specific search signal is allocated.

8 Claims, 9 Drawing Sheets

(51) Int. Cl.
*H04B 7/26* (2006.01)
*H04L 5/00* (2006.01)
*H04W 8/00* (2009.01)
*H04W 72/12* (2009.01)

(56) References Cited

U.S. PATENT DOCUMENTS

| | | |
|---|---|---|
| 2013/0273923 A1 | 10/2013 | Li et al. |
| 2013/0324114 A1* | 12/2013 | Raghothaman ..... H04W 76/023 455/426.1 |
| 2015/0004984 A1 | 1/2015 | Kim et al. |
| 2015/0119055 A1* | 4/2015 | Shin ..................... H04W 8/005 455/450 |
| 2015/0195823 A1* | 7/2015 | Seo ................... H04W 72/0406 370/329 |
| 2016/0219574 A1* | 7/2016 | Ribeiro ............. H04W 52/0216 |

* cited by examiner

FIG. 2
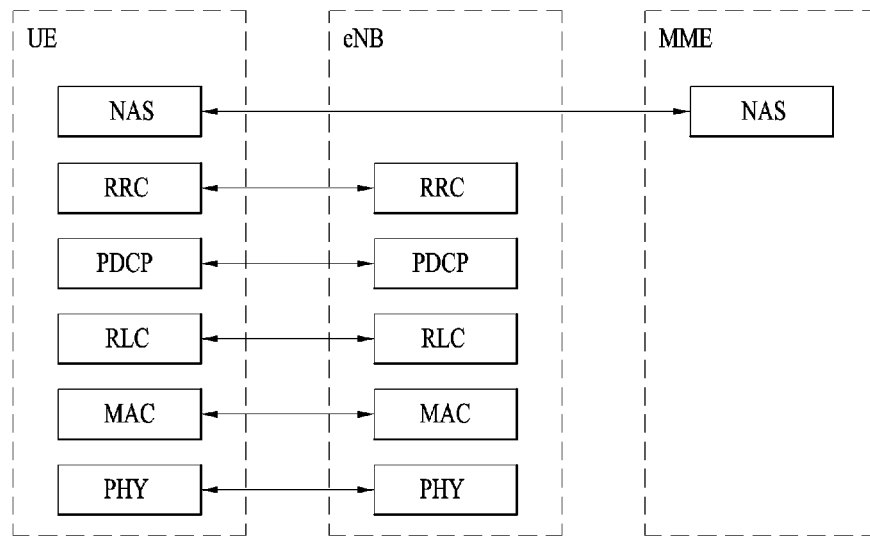
(a) control-plane protocol stack
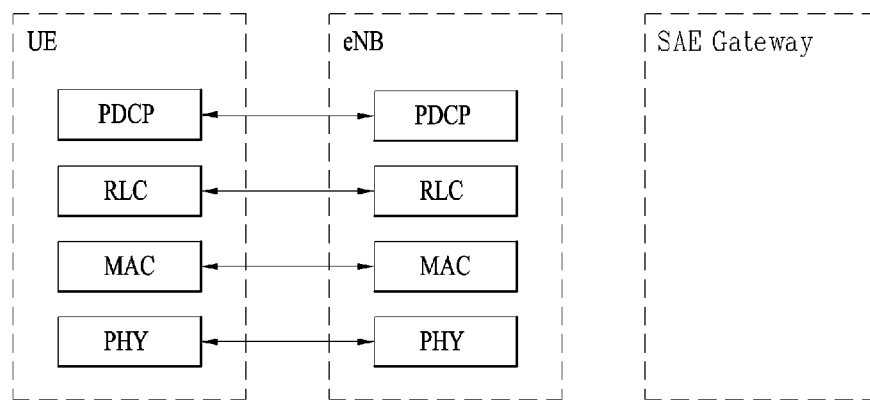
(b) user-plane protocol stack FIG. 8
(a) 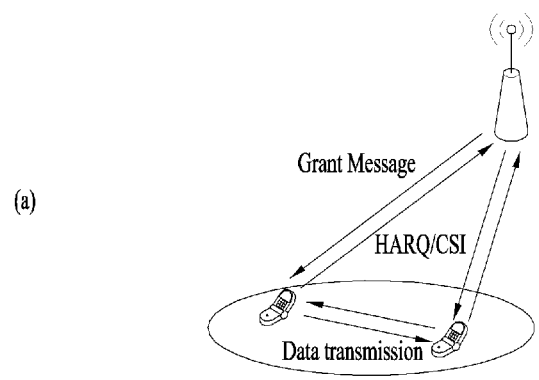
(b) 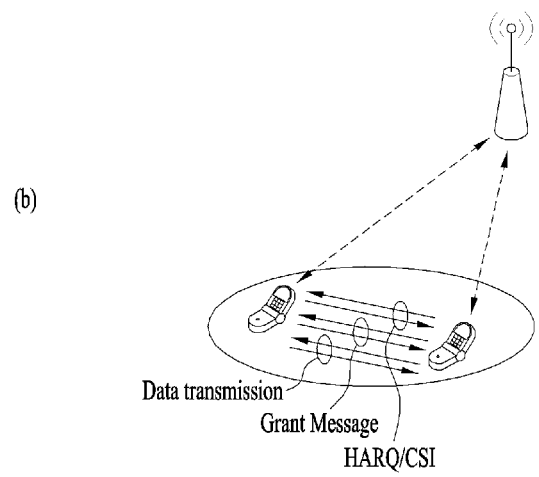

FIG. 9

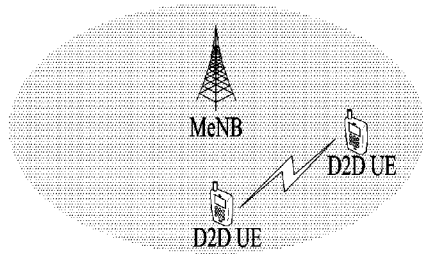

(a) case that D2D UEs participating in D2D ProSe are all positioned at the inside of network coverage

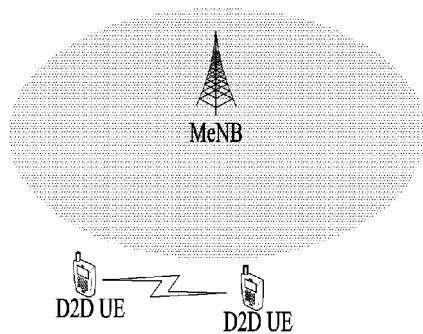

(b) case that D2D UEs participating in D2D ProSe are all positioned at the outside of network coverage

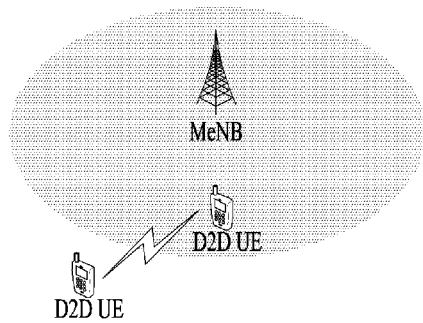

(c) case that a part of UEs participating in D2D ProSe are positioned at the inside of network coverage and the remaining D2D UEs are positioned at the outside of the network coverage

METHOD FOR TRANSMITTING AND RECEIVING CONTROL INFORMATION FOR DEVICE-TO-DEVICE (D2D) COMMUNICATION IN WIRELESS COMMUNICATION SYSTEM AND APPARATUS THEREFOR

CROSS REFERENCE TO RELATED APPLICATIONS

This application is the National Phase of PCT International Application No. PCT/KR2014/010287, filed on Oct. 30, 2014, which claims priority under 35 U.S.C. 119(e) to U.S. Provisional Application No. 61/897,821, filed on Oct. 30, 2013, all of which are hereby expressly incorporated by reference into the present application.

TECHNICAL FIELD

The present invention relates to a wireless communication system, and more particularly, to a method of transmitting and receiving control information for D2D communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

A terminal periodically and/or aperiodically reports information on a current channel state to a base station to assist efficient management of a wireless communication system of the base station. Since the information on the channel state reported to the base station is able to include results calculated in consideration of various situations, a more efficient reporting method is required.

DISCLOSURE OF THE INVENTION

Technical Task

An object of the preset invention is to provide a method of transmitting and receiving control information for D2D communication in a wireless communication system and an apparatus therefor based on the aforementioned discussion.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving control information, which is received by a user equipment (UE) for a D2D (device-to-device) ProSe in a wireless communication system, includes the steps of receiving information on radio resources semi-statically configured for the D2D ProSe (device-to-device proximity service) and receiving a downlink control information (DCI) for indicating whether to activate the D2D ProSe on a specific radio resource among the radio resources. In this case, the downlink control information is valid only in a discovery procedure to which a resource for UE-specifically transmitting a discovery signal is allocated.

Moreover, a length of a DCI format associated with the downlink control information may correspond to a length equal to or less than a predetermined length.

Moreover, a length of a DCI format associated with the downlink control information can be determined according to a bandwidth configured for the D2D ProSe.

Moreover, whether to activate the D2D ProSe can be indicated using a resource block assignment field of a DCI format used for determining whether to activate semi-persistent scheduling. Preferably, the specific radio resource can be indicated by an index of a D2D resource unit using the resource block assignment field. Or, a size of the resource block assignment field can be determined according to a system bandwidth. The resource block assignment field is configured by first bits and second bits, the first bits are used for indicating an index of a D2D resource unit and the second bits are used for indicating a D2D discovery subframe.

Moreover, either a procedure of transmitting and receiving a D2D discovery signal or a procedure of transmitting and receiving a D2D communication signal can be determined according to a position of the specific radio resource.

Moreover, whether to activate the D2D ProSe can be indicated by redefining a specific field among fields of a DCI format used for determining whether to activate semi-persistent scheduling.

To further achieve these and other advantages and in accordance with the purpose of the present invention, according to a different embodiment, a user equipment receiving control information for a D2D (device-to-device) ProSe in a wireless communication system includes an RF (radio frequency) unit and a processor, the processor configured to receive information on radio resources semi-statically configured for the D2D ProSe (device-to-device proximity service), the processor configured to receive a downlink control information (DCI) for indicating whether to activate the D2D ProSe on a specific radio resource among the radio resources. In this case, the downlink control information is valid only in a discovery procedure to which a resource for UE-specifically transmitting a discovery signal is allocated.

Advantageous Effects

According to embodiments of the present invention, it is able to efficiently transmit and receive control information for D2D communication in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

FIG. 8 is a diagram for explaining D2D (UE-to-UE) communication;

FIG. 9 is a diagram for explaining scenarios for performing D2D communication;

BEST MODE

Mode for Invention

Figure 1:
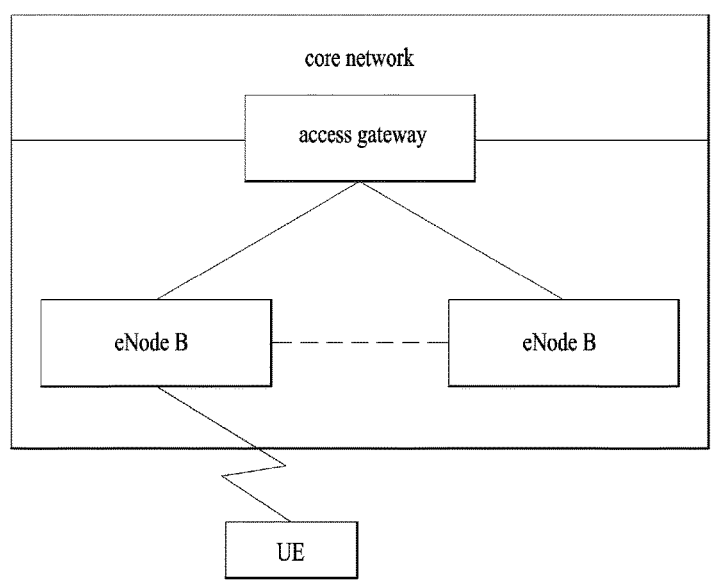
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
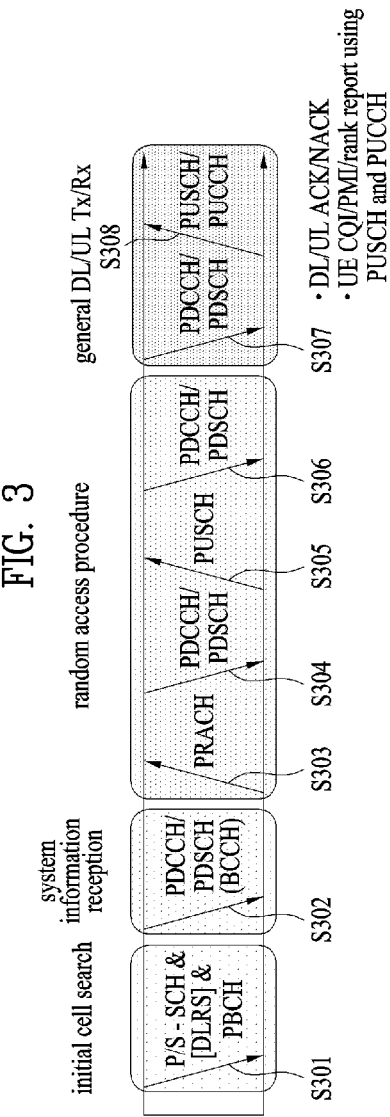
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (AN). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
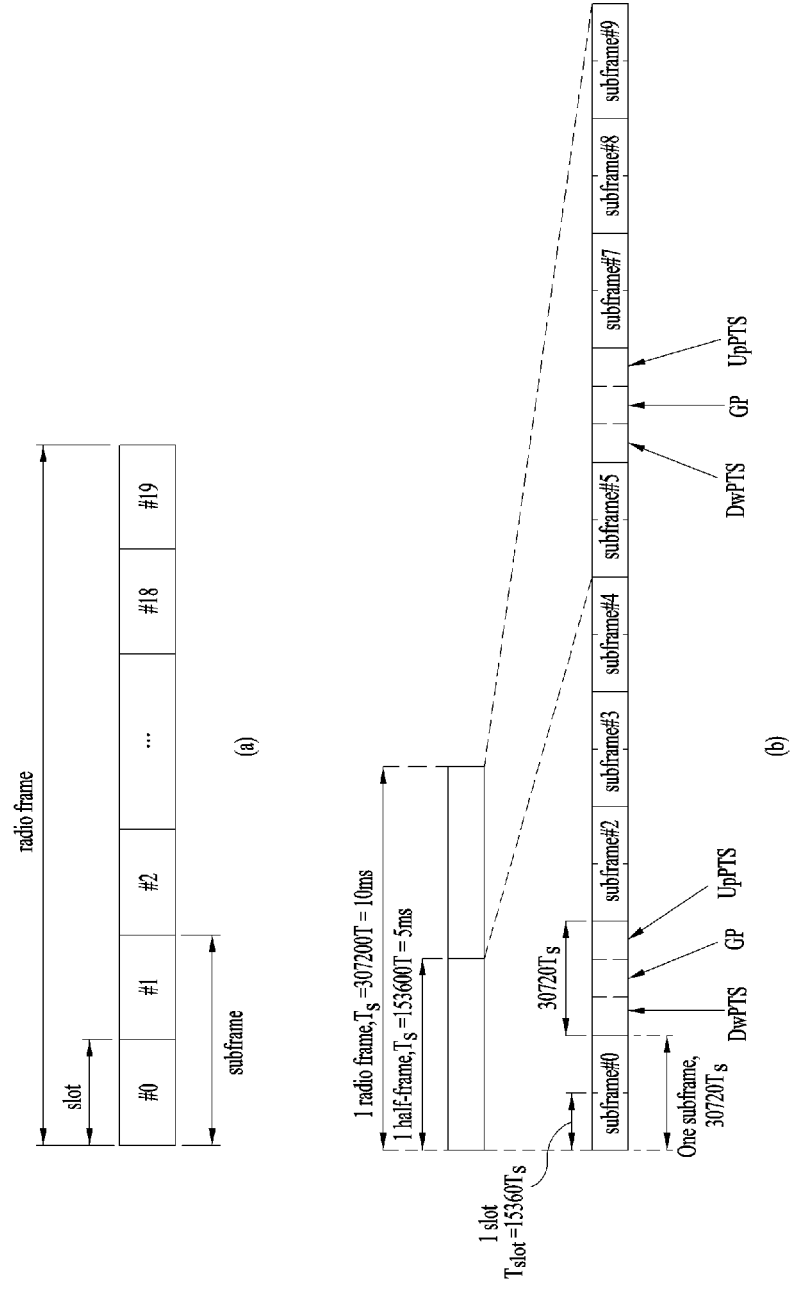
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
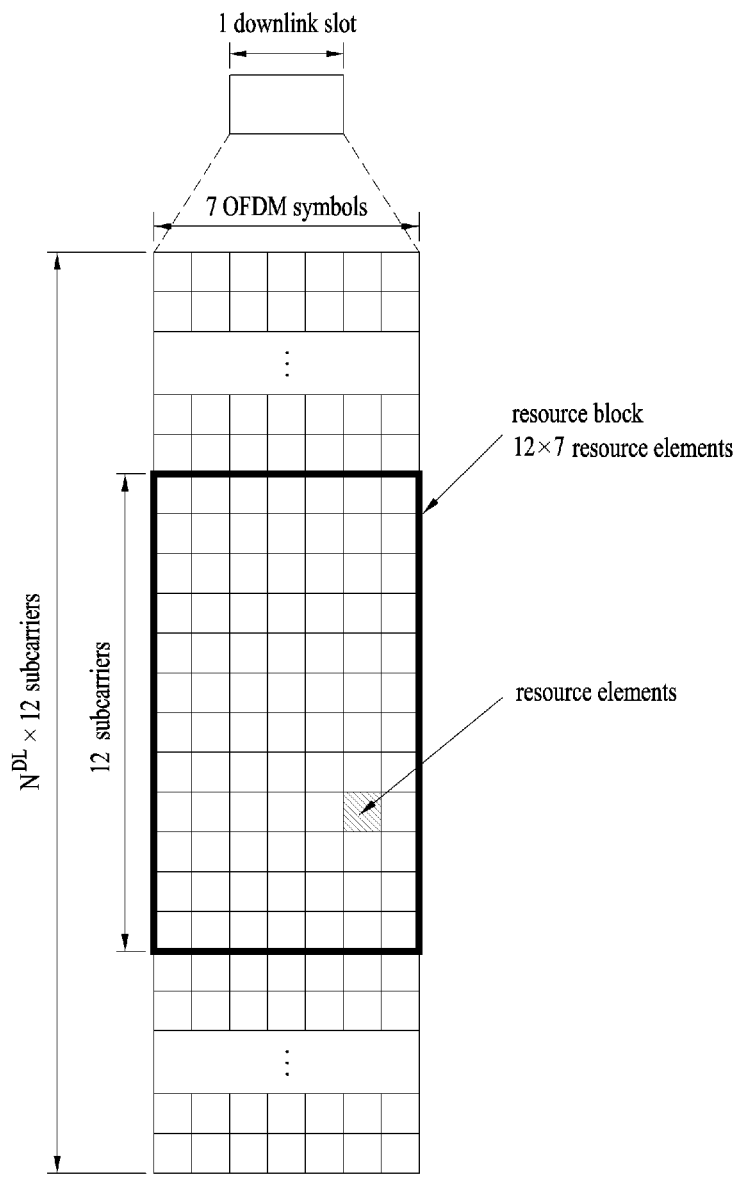
FIG. 5 is a diagram of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | number $N_{RB}^{DL}$ of resource blocks included in the downlink slot depends on a downlink transmission bandwidth configured in the cell.

Figure 6:
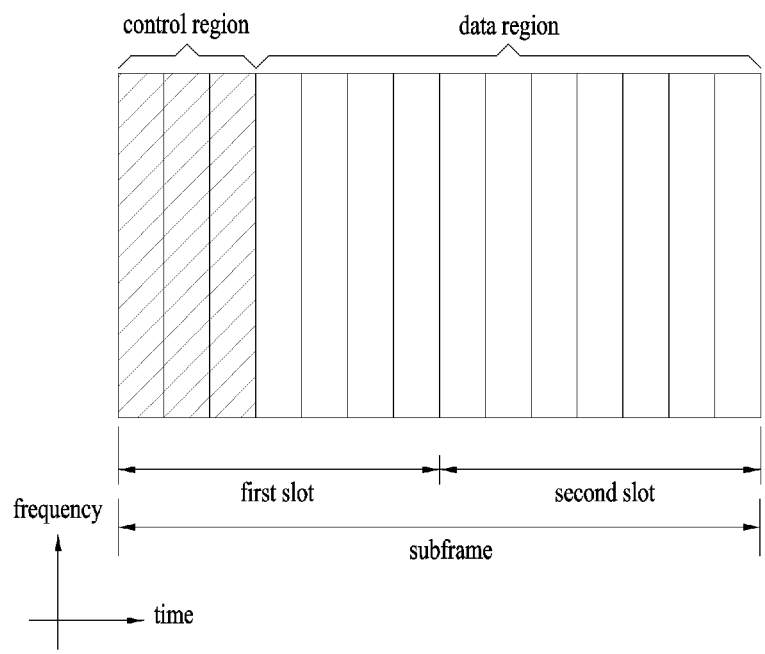
FIG. 6 is a diagram for an example of a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

In the following description, for the understanding of the present invention, a method of activating or deactivating (releasing) legacy semi-persistent scheduling (SPS) is explained. In particular, a base station designates specific fields on a partial DCI format transmitted on a downlink control channel (e.g., PDCCH, EPDCCH) to a UE using predefined values to implicitly inform the UE of activation or deactivation of the SPS.

In this case, the specific fields on the partial DCI format designated by the predefined values can be utilized for a usage of a virtual CRC. By doing so, it is able to increase a ratio of successfully receiving control information on the activation or the deactivation of the SPS. Moreover, the UE may attempt to detect a DCI format related to the activation or the deactivation of the SPS using an SPS C-RNTI received from the base station in advance (i.e., The CRC parity bits obtained for the PDCCH payload are scrambled with the Semi-Persistent Scheduling C-RNTI).

According to legacy LTE, it is able to inform a UE of subframes in which SPS transmission/reception is to be performed via RRC (radio resource control) signaling for UL and/or DL SPS. In particular, a time resource is preferentially designated via RRC signaling among time-frequency resources allocated for the SPS. In order to notify a usable subframe, for example, it may be able to inform the UE of a period and an offset of a usable subframe. Yet, since the UE receives allocation of a time resource region only via the RRC signaling, although the UE receives the RRC signaling, the UE does not immediately perform transmission and reception scheduled by the SPS. Instead, the UE completes time-frequency resource allocation by allocating a frequency resource region according to a necessity. When the frequency resource region is allocated, it may be referred to as activation. On the contrary, when the frequency resource region is released, it may be referred to as deactivation.

Hence, when the UE receives PDCCH for indicating the activation, the UE allocates a frequency resource according to RB allocation information included in the received PDCCH, applies a modulation and a code rate according to MCS (modulation and coding scheme) information and starts to perform transmission and reception according to a subframe period and an offset assigned through the RRC signaling. Subsequently, if the UE receives PDCCH for indicating the deactivation, from the base station, the UE terminates transmission and reception. If the UE receives PDCCH for indicating activation and reactivation after the transmission and the reception are terminated, the UE resumes transmission and reception with a subframe period and an offset assigned by RRC signaling using RB allocation, MCS and the like designated by the PDCCH. In particular, although a time resource is allocated through RRC signaling, a signal can be actually transmitted and received after PDCCH for indicating activation and reactivation of the SPS is received. And, transmission and reception of a signal can be terminated after PDCCH for indicating deactivation of the SPS is received.

A UE can check PDCCH including an SPS indication only if all the following conditions are met. First of all, the CRC parity bits added for the PDCCH payload are scrambled with the SPS C-RNTI. Secondly, the new data indicator (NDI) field is set to '0'. In this case, in case of DCI formats 2, 2A, 2B, 2C and 2D, the new data indicator field refers to the one for the enabled transport block.

And, a UE can check EPDCCH including an SPS indication only if all the following conditions are met. First of all, the CRC parity bits added for the EPDCCH payload are scrambled with the SPS C-RNTI. Secondly, the new data indicator (NDI) field is set to '0'. In this case, in case of DCI formats 2, 2A, 2B, 2C and 2D, the new data indicator field refers to the one for the enabled transport block.

Validation is achieved if all the fields for the respective used DCI format are set according to Table 3 or Table 4. If validation is achieved, the UE shall consider the received DCI information accordingly as a valid SPS activation or deactivation (release). On the contrary, if validation is not achieved, the received DCI format shall be considered by the UE as having been received with a non-matching CRC.

Table 3 in the following shows fields for validating PDCCH/EPDCCH indicating SPS activation.

TABLE 3

|  | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 4 in the following shows fields for validating PDCCH/EPDCCH indicating SPS deactivation (or release).

TABLE 4

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

If a DCI format indicates a SPS downlink scheduling activation, the TPC command for PUCCH field shall be used as an index to one of the four PUCCH resource values configured by higher layers. Mapping relation between a TPC command and a PUCCH resource value is shown in Table 5 in the following.

Table 5 shows a PUCCH resource value for downlink SPS scheduling.

TABLE 5

| Value of 'TPC command for PUCCH' | $n_{PUCCH}^{(1, p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Figure 7:
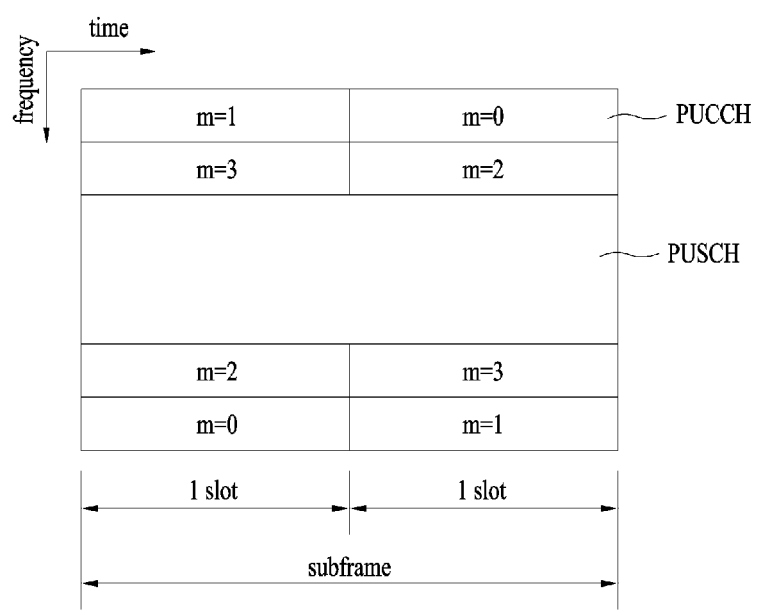
FIG. 7 is a diagram for an example of a structure of an uplink subframe in LTE.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In the following, D2D (UE-to-UE) communication is explained.

A D2D communication scheme can be mainly divided into a scheme of receiving the help from a network/coordination station (e.g., eNB) and a scheme of not receiving the help from the network/coordination station.

Referring to FIG. 8, FIG. 8 (a) shows a scheme that a network/coordination station involves itself in transmitting and receiving a control signal (e.g., a grant message), HARQ, channel state information, and the like and data transmission and reception are performed between UEs performing D2D communication only. FIG. 8 (b) shows a scheme that a network provides minimum information (e.g., D2D connection information capable of being used in a corresponding cell) to UEs and the UEs performing D2D communication form a link and perform data transmission and reception.

In the following, a method for a specific UE to efficiently decode a discovery signal (DS) in environment where D2D (device-to-device) communication is performed is explained based on the aforementioned discussion.

In the following, for clarity, the present invention is explained based on 3GPP LTE system. However, a system range to which the present invention is applied can also be extended to a different system rather than the 3GPP LTE system. Embodiments of the present invention can be applied not only to a case that a partial time resource region and/or a partial frequency resource region of a legacy system is allocated for a usage of D2D communication but also to a case that a new time resource region and/or a new frequency resource (different from a legacy resource) is (re)allocated for the D2D communication.

D2D communication can be mainly divided into two phases. The first phase corresponds to "discovery phase" and a discovery signal is transmitted/received between D2D UEs in the discovery phase. In this case, a sequence of a discovery signal transmitted by a specific D2D UE can be generated by a function with such an input variable as i) an identifier (UE ID) of the D2D UE, ii) a group identifier (group ID), iii) a new identifier (new UE ID) assigned in advance, iv) a time/frequency resource index for transmitting a discovery signal and the like. Hence, a random D2D UE can identify whether or not a different D2D UE is adjacent to the random D2D UE based on a distance, whether or not the different D2D UE is able to perform D2D data communication, and the like.

The second phase of the D2D communication corresponds to a communication phase. The communication phase includes i) an operation of actually performing D2D data communication, ii) an operation of performing preceding procedures predefined for stable D2D data communication (i.e., "D2D link setup procedure" e.g., resource allocation, MCS configuration, power control, synchronization control, etc.) performed with the different D2D UE identified by the first phase (i.e., discovery phase).

A concept of the D2D communication described in the foregoing description is just one of various D2D communication situations to which the present invention is applicable. The present invention described in the following can be extensively applied to D2D communication situation of a different concept/configuration/scenario as well.

FIG. 9 is a diagram for examples of various environment or scenarios in which D2D communication (e.g., discovery phase and/or communication phase) is performed.

Referring to FIG. 9, D2D communication can be performed in a situation that D2D UEs performing D2D communication are all positioned at the inside of network coverage as shown in FIG. 9 (a), in a situation that D2D UEs performing D2D communication are all positioned at the outside of network coverage as shown in FIG. 9 (b) and in a situation that that a part of D2D UEs performing D2D communication are positioned at the inside of network coverage and the remaining D2D UEs are positioned at the outside of the network coverage as shown in FIG. 9 (c).

And, a signal transmission/reception procedure required for the discovery phase and/or the communication phase and a signal information configuration can be differently defined according to individual environment or scenario of FIG. 9 (i.e., FIG. 9 (a) to FIG. 9 (c)).

In the following, a type of a D2D discovery signal and a resource configuration method are explained. Types of a D2D discovery signal and the resource configuration method are shown in Table 6 in the following.

TABLE 6

Figure 10:
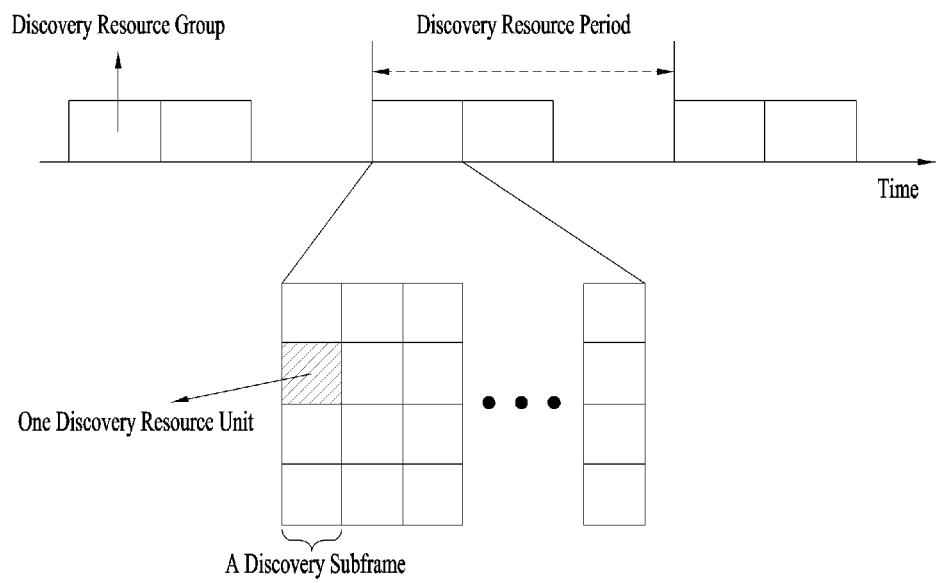
FIG. 10 is a diagram for explaining a resource configuration of a UE-specific D2D discovery signal (i.e., D2D discovery signal of a type 2)

The details of the two discovery types:
    [TYPE 1]: a discovery procedure where resources for discovery
    signal transmission are allocated on a non UE specific basis
        Note: Resources can be for all UEs or group of UEs
    [TYPE 2]: a discovery procedure where resources for discovery
    signal transmission are allocated on a per UE specific basis
        TYPE 2A: Resources are allocated for each specific transmission
        instance of discovery signals
        TYPE 2B: Resources are semi-persistently allocated for
        discovery signal transmission
Discovery message transmission resource configuration:
Discovery message transmission resource configuration consists of a
number of subframes and a discovery period, and FFS a number of PRBs
    The number of discovery subframes and the discovery period may be
    semi-statically configured at least when in coverage
    Individual discovery message transmission resources are not CDM
    All individual discovery message transmission resources are the
    same size FIG. 10 is a diagram for explaining a concept for a resource configuration of a type 2 D2D discovery signal shown in Table 6. Referring to FIG. 10, a predetermined amount of resources capable of being used for the usage of transmitting/receiving a D2D discovery signal is represented as a discovery resource group (DRG) and the predetermined number of discovery subframes (DSF) and discovery resource units (DRU) are included in a specific discovery resource group. And, the predetermined number of discovery resource units exist in a specific discovery subframe and a specific discovery resource unit consists of the predetermined number of PRBs.

In this case, a size of a discovery resource unit used for transmitting a D2D discovery signal and a size of a discovery resource unit used for transmitting D2D communication can be differently defined. Moreover, a size of a discovery resource unit can be configured to be changed according to a change of a system bandwidth or a change of a bandwidth configured for the usage of ProSe (D2D bandwidth). Or, it may define a (re)configuration operation (configurability) with regard to a size of a discovery resource unit.

And, the predefined number of discovery resource groups exist on a specific discovery period. In addition, it may be able to configure a base station to semi-statically or dynamically inform a UE of at least one selected from the group consisting of i) a discovery period configuration value, ii) the number of discovery resource groups existing on a specific discovery period, iii) the number of discovery subframes and the number of discovery resource units existing on a specific discovery resource group, iv) the number of discovery resource units existing on a specific discovery subframe, and v) the number of PRBs constructing a specific discovery resource unit. Or, it may be able to configure a specific D2D UE to semi-statically or dynamically inform a different D2D UE of at least one selected from the group consisting of i) a discovery period configuration value, ii) the number of discovery resource groups existing on a specific discovery period, iii) the number of discovery subframes and the number of discovery resource units existing on a specific discovery resource group, iv) the number of discovery resource units existing on a specific discovery subframe, and v) the number of PRBs constructing a specific discovery resource unit through a predefined signal.

In the following description, the present invention proposes a method of efficiently notifying resource information to be used for transmitting a D2D signal (e.g., D2D discovery signal and/or D2D communication signal) on a DCI when initiation of transmitting the D2D signal (e.g., D2D discovery signal and/or D2D communication signal) is activated or deactivated by a predefined control channel (e.g., PDCCH, EPDCCH) in a situation that a resource related to a device-to-device proximity service (D2D ProSe) (e.g., number/position of D2D SFs) is semi-statically or statically configured.

In the following description, the DCI according to embodiments of the present invention can be used for the usage of notifying resource information to be used for receiving a D2D signal (e.g., a D2D discovery signal and/or a D2D communication signal) when initiation of receiving the D2D signal (e.g., D2D discovery signal and/or D2D communication signal) is activated or deactivated by a control channel in a situation that a resource related to ProSe is semi-statically or statically configured.

And, it may be able to configure the embodiments of the present invention to be restrictively applied in a situation that a D2D discovery signal of the aforementioned specific type (i.e., D2D discovery signal type 2) is set and/or a specific environment in which a D2D communication signal is performed (i.e., D2D DS/CM within network coverage) only.

Additionally, the DCI according to the present invention can also be used for the usage of notifying resource information to be used for transmitting/receiving a D2D signal (e.g., D2D discovery signal and/or D2D communication signal) when initiation of transmitting and receiving the D2D signal (e.g., D2D discovery signal and/or D2D communication signal) is activated or deactivated by a predefined higher layer signal in a situation that a Pro Se-related resource is semi-statically or statically configured.

In the present invention, a DCI, which is transmitted to activate or deactivate initiation of transmitting/receiving a D2D signal (e.g., a D2D discovery signal and/or a D2D communication signal), and a DCI, which is transmitted to notify resource information to be used for transmitting and receiving a D2D signal (e.g., a D2D discovery signal and/or a D2D communication signal), can be independently defined, respectively.

Embodiment 1

A case of activating/deactivating initiation of transmitting a D2D signal by a predefined control channel in a situation that a ProSe-related resource (e.g., number/position of D2D SFs) is semi-statically or statically configured is explained according to the first embodiment of the present invention. In this case, a length/structure of a DCI format, which is transmitted to notify resource information related to transmission of the D2D signal (e.g., D2D discovery signal and/or D2D communication signal), can be configured to reuse a legacy DCI format (e.g., DCI format 0, DCI format 1A or DCI format 1C) of a relatively short length (e.g., on the basis of a predefined or signaled specific value) to secure high reliability, prevent the number of performing blind decoding (BD) additionally performed by a UE from being increased or implement a simple controlling procedure-based D2D ProSe.

For example, a D2D UE can be configured to detect at least one of i) a DCI format, which is transmitted to notify resource information related to transmission of a D2D signal (e.g., D2D discovery signal and/or D2D communication signal) and ii) a DCI format, which is transmitted to notify activation or deactivation of the initiation of transmitting a D2D signal (e.g., D2D discovery signal and/or D2D communication signal), based on a predetermined or signaled C-RNTI of the D2D UE, a temporary C-RNTI, an SPS C-RNTI, or a D2D-RNTI newly configured or signaled for D2D usage.

As a different example, since an amount of bits required for notifying resource information related to transmission of a D2D signal (e.g., D2D discovery signal and/or D2D communication signal) varies according to a change of a system bandwidth or a change of a bandwidth (D2D bandwidth) configured for a ProSe usage, it is able to configure a length of a DCI format, which is transmitted to notify the resource information related to the transmission of the D2D signal (e.g., D2D discovery signal and/or D2D communication signal), to be adaptively (re)configured (configurability).

Embodiment 2

In order to notify activation or deactivation of initiation of transmitting a D2D signal (e.g., D2D discovery signal and/or D2D communication signal) or in order to notify resource information related to transmission of a D2D signal (e.g., D2D discovery signal and/or D2D communication signal) in a situation that a ProSe-related resource (e.g., number/position of DS SF) is semi-statically or statically configured, it is able to configure i) a specific DCI format, which was used for activating or deactivating a legacy SPS, to be reused, ii) partial fields of a specific DCI format to be used in a manner of modifying/aggregating/reinterpreting the partial fields or iii) values of partial fields (refer to Table 3 or Table 5), which are configured by a fixed value on a specific DCI format to notify activation/deactivation of a legacy SPS, to be used in a manner of modifying/aggregating/reinterpreting the partial fields. In this case, a D2D UE can be configured to detect at least one of i) a DCI format, which is transmitted to notify resource information related to transmission of a D2D signal (e.g., D2D discovery signal and/or D2D communication signal) and ii) a DCI format, which is transmitted to notify activation or deactivation of the initiation of transmitting a D2D signal (e.g., D2D discovery signal and/or D2D communication signal), based on a predetermined or signaled SPS C-RNTI of the D2D UE, a C-RNTI, a temporary C-RNTI, or a D2D-RNTI newly configured or signaled for D2D usage.

As an example of the embodiment 2 of the present invention, it may be able to configure to reuse a resource block assignment (RBA) field of a specific DCI format previously used for activating or deactivating a legacy SPS to notify resource information related to transmission of a D2D signal (e.g., D2D discovery signal and/or D2D communication signal). In other word, the resource information related to the transmission of the D2D signal (e.g., D2D discovery signal and/or D2D communication signal) can be defined by a form of notifying an index or a position of a D2D resource unit (D2D RU) by reusing the resource block assignment (RBA) field of the specific DCI format previously used for activating or deactivating the legacy SPS.

In this case, the D2D resource unit (D2D RU) index, which is indicated by reusing the RBA field of the specific DCI format, can be configured to perform re-indexing on all D2D RUs (e.g., in FIG. 10, all DRUs positioned on the predefined number of discovery subframes corresponding to a specific discovery resource group) positioned on the predetermined number and/or positions of D2D subframes in frequency-first direction or time-first direction and use a corresponding result value.

Or, the D2D resource unit index, which is indicated by reusing the RBA field of the specific DCI format, can be configured to perform indexing on all D2D RUs (e.g., in FIG. 10, all discovery resource units positioned on a specific discovery subframe) positioned on a specific D2D subframe in frequency-first direction or time-first direction and use a corresponding result value. In particular, the aforementioned method can be comprehended as indexing is independently performed on a D2D resource unit according to a D2D subframe (e.g., in FIG. 10, indexing is independently performed on a discovery resource unit according to a discovery subframe).

As a further different example, a size of a resource block assignment (RBA) field on a legacy specific DCI format changes according to a change of a system bandwidth. However, if a D2D discovery signal usage-related bandwidth (DS bandwidth) and/or a D2D signal usage-related bandwidth is separately configured, it may be able to configure i) indexing for a D2D discovery signal-related resource unit (RU) and/or indexing for a D2D communication signal-related resource unit to be performed on a system bandwidth or ii) indexing to be performed on a D2D discovery signal usage-related bandwidth (and/or the D2D discovery signal usage-related bandwidth to which indexing for a D2D discovery signal-related resource unit (RU) and/or indexing for a D2D communication signal-related resource unit is set.

In this case, the former method (i.e., indexing for a D2D discovery signal-related resource unit is performed on a system bandwidth) can be applied when a size of an RBA field on a specific DCI format is able to sufficiently satisfy the number of bits required to notify resource information related to transmission of a D2D discovery signal (e.g., D2D discovery signal and/or D2D communication signal). On the contrary, the latter method (i.e., indexing for a D2D discovery signal-related resource unit is performed on a D2D discovery signal usage-related bandwidth) can be applied when a size of an RBA field on a specific DCI format is unable to sufficiently satisfy the number of bits required to notify resource information related to transmission of a D2D discovery signal (i.e., it can also be comprehended as the D2D discovery signal usage-related bandwidth and/or the D2D discovery usage-related bandwidth is controlled in consideration of the size of the RBA field).

Table 7 in the following shows that sizes of the resource block assignment (RBA) field of DCI formats used for activating or deactivating legacy SPS vary according to a change of a system bandwidth on a legacy LTE wireless communication system. In this case, as an example, a DCI format 0 assumes a case of "Non-hopping PUSCH with Single-Cluster Allocation", a DCI format 1A assumes a case of "Localized VRB" and DCI format 1/1A/2/2A/2B/2C/2D assume a case of "Resource Allocation type 0".

TABLE 7

| System Bandwidth (RB) | Resource Block Assignment Bits in DCI Format 0/1A | Resource Block Assignment Bits in DCI Format 1/2/2A/2B/2C/2D |
|---|---|---|
| 6 | 5 | 6 |
| 15 | 7 | 8 |
| 25 | 9 | 13 |
| 50 | 11 | 17 |
| 75 | 12 | 19 |
| 100 | 13 | 25 |

Specifically, if a specific discovery resource unit (DRU) is defined by 1 RB and a resource block allocation field of a DCI format 0, which is previously used for activating or deactivating a legacy SPS, is reused to notify information on a discovery resource unit index (position), all of 100 discovery resource unit indexes (positions) can be notified using 7 bits only among the total 13 bits of the resource block allocation field (i.e., it is able to designate maximum 128 discovery resource unit indexes (positions)). In this case, i) the remaining bits (i.e., 6 bits) not used for notifying the information on the DRU index (position) can be configured to be padded by a predetermined value (i.e., 0). Or, ii) the bits (i.e., 7 bits) configured (used) to notify the DRU index (position) can be configured to be repeatedly inputted (repetition & rate-matching) until the RBA fields are fully filled (sort of circular shift operation). Or, iii) the remaining bits not used for notifying the DRU index (position) information can be configured to be reserved.

As a different example, in case of reusing a resource block allocation field of a specific DCI format, which is previously used for activating or deactivating a legacy SPS to notify resource information related to transmission of a D2D signal (e.g., D2D discovery signal and/or D2D communication signal), it is able to configure a D2D UE to finally identify the resource information related to transmission of the D2D signal (e.g., D2D discovery signal and/or D2D communication signal) using a result value, which is deducted by inputting a value of the resource allocation field of the signaled specific DCI format to a predefined function.

As a further different example, in a situation of FIG. 10, if a D2D UE indicates to perform single D2D discovery signal transmission only in a discovery resource group (DRG), the remaining bits (i.e., 6 bits) not used for notifying the discovery resource unit index (position) information can also be configured for a usage of notifying an index (position) of a discovery subframe (DSF) in which actual D2D discovery signal transmission is to be performed. In this case, 64 discovery subframe indexes (positions) in total can be notified by the remaining 6 bits not used for notifying the discovery resource unit index (position) information.

Or, the remaining bits (i.e., 6 bits) not used for notifying the discovery resource unit index (position) information can also be configured for a usage of notifying a space (i.e., K) between a subframe position (i.e., SF #N)) at which DCI information (or a message) related to the activation of transmission of a D2D discovery signal is received and a discovery subframe position (i.e., SF #(N+K)) at which actual D2D discovery signal transmission is to be performed.

Or, the remaining bits (i.e., 6 bits) not used for notifying the discovery resource unit index (position) information can also be used as a sort of timing offset information. If a D2D UE receives the offset information (i.e., 01), the D2D UE calculates a sum with a different offset value (i.e., 02) signaled (configured) in advance, applies the sum value (i.e., "01+02") from a subframe position (i.e., SF #N) at which DCI information (or message) related to activation of initiating transmission of a D2D discovery signal is received and may be then able to identify a discovery subframe position (i.e., SF # (N+01+02)) at which actual D2D discovery signal transmission is to be performed.

Or, it may be able to configure timing offset value information corresponding to configuration values (states) of the remaining bits (i.e., 6 bits) not used for notifying the discovery resource unit index (position) information via predefined signaling/configuration. In this case, if a D2D UE receives bits corresponding to a specific configuration value, the D2D UE applies a timing offset value (i.e., 03) corresponding to the configuration value from a subframe position (i.e., SF #N) at which DCI information (or message) related to activation of initiating transmission of a D2D discovery signal is received and may be then able to identify a discovery subframe position (i.e., SF # (N+03)) at which actual D2D discovery signal transmission is to be performed.

As a further different example, it is able to configure resource information (e.g., discovery resource unit index (position) information, discovery subframe index (position) information, etc.) related to transmission of a D2D discovery signal (e.g., D2D discovery signal and/or D2D communication signal) to be identified by a combination of fields designated on a specific DCI format, which is previously used for activating or deactivating a legacy SPS. The resource information can be efficiently notified using bits of which pluralities of fields are combined. Moreover, the field combination information can be signaled or configured in advance or can be designated by a partial combination from among fields described in the following.

Carrier indicator
Flag for distinguishing format0 from format1A
Frequency hopping flag
Resource block allocation and hopping resource allocation
Modulation and coding scheme and redundancy version)
New data indicator)
TPC command for scheduled PUSCH)
Cyclic shift for DM RS (Demodulation Reference Signal) and OCC (Orthogonal Cover Code) index
Uplink index
Downlink Assignment Index
Channel state information request
SRS request
Resource allocation type
Resource allocation header (resource allocation type 0/type 1
Resource block allocation
Modulation and coding scheme)
HARQ process number
Redundancy version
TPC command for PUCCH)
HARQ-ACK resource offset)
Localized/Distributed VRB assignment flag When the field combination of the aforementioned usage is designated, i) it is able to configure (all or a part of) fields configured by a fixed value to notify activation/deactivation of a legacy SPS (refer to Table 3 to Table 5) to be excluded. Or, ii) if a field configured by a fixed value to notify activation/deactivation of the legacy SPS is selected, it is able to configure the remaining bits, which are not configured by the fixed value, to be used on the field only. When the field combination of the aforementioned usage is designated, i) it is able to configure (all or a part of) fields configured by a fixed value to notify activation/deactivation of initiation of transmitting a D2D discovery signal (e.g., D2D discovery signal and/or D2D communication signal) to be excluded. Or, ii) if a field configured by a fixed value to notify activation/deactivation of initiation of transmitting a D2D discovery signal (e.g., D2D discovery signal and/or D2D communication signal) is selected, it is able to configure the remaining bits, which are not configured by the fixed value, to be used on the field only.

As a further different example of the embodiment of the present invention, resource information related to transmission of a D2D signal (e.g., D2D discovery signal and/or D2D communication signal) can be configured to be identified by reinterpreting values of a field combination designated in advance on a specific DCI format, which is previously used for activating or deactivating a legacy SPS, (according to a predefined rule). In this case, since it is able to sufficiently secure the number of bits required for notifying the resource information related to the transmission of the D2D signal (e.g., D2D discovery signal and/or D2D communication signal), a D2D UE can control a PUSCH SPS operation of the D2D UE and a D2D discovery signal (e.g., type 2 DS) transmission operation at the same time based on a (legacy) SPS C-RNTI without a process of receiving a separate RNTI.

Embodiment 3

According to embodiment 3 of the present invention, in a situation that a ProSe-related resource (e.g., number/position of D2D subframes) is semi-statically or statically configured, i) it is able to configure uplink scheduling information (UL grant) to be used as one selected from the group consisting of a) resource information related to transmission of a D2D discovery signal, b) resource information related to transmission of a D2D communication signal and c) resource information related to transmission of a WAN UL data (PUSCH) according to a downlink subframe position at which uplink scheduling information (UL grant) related to transmission of uplink data channel (PUSCH) is received. Or, ii) it is able to configure resource allocation information on a corresponding UL DCI format or the UL DCI format to be used as one selected from the group consisting of a) resource information related to transmission of a D2D discovery signal, b) resource information related to transmission of a D2D communication signal and c) resource information related to transmission of a WAN UL data (PUSCH) according to an uplink subframe position at which UL scheduling information (UL grant)-based uplink data channel (PUSCH) is actually transmitted.

According to the embodiment 3 of the present invention, if it is necessary to receive uplink scheduling information (UL grant) at the time of SF #N and transmit an uplink signal (or channel) at the time of SF # (N+K) according to a predefined uplink HARQ timeline, a usage of the uplink scheduling information (UL grant) (or, the resource allocation information on the UL DCI format or the UL DCI format) can be configured to be interpreted as a) resource information related to transmission of a D2D discovery signal, b) resource information related to transmission of a D2D communication signal or c) resource information related to transmission of a WAN UL data (PUSCH) depending on whether the SF #(N+K) corresponds to a subframe configured for a usage of transmitting a D2D discovery signal, a subframe configured for a usage of transmitting a D2D communication signal or a subframe configured for a usage of transmitting WAN UL data (PUSCH).

Embodiment 4

According to embodiment 4 of the present invention, in a situation that a ProSe-related resource (e.g., number/position of D2D subframes) is semi-statically or statically configured, if a specific DCI format, which is previously used for activating or deactivating a legacy SPS, is reused to notify activation or deactivation of initiation of transmitting a D2D signal (e.g., D2D discovery signal and/or D2D communication signal) or notify resource information related to transmission of a D2D signal (e.g., D2D discovery signal and/or D2D communication signal), it is able to configure values (refer to Table 3 to Table 5) of partial fields, which are configured by a fixed value to notify activation or deactivation of a legacy SPS on a specific DCI format, to be identically maintained (i.e., field value configurations capable of being used not only for a virtual CRC but also for a usage of indicating activation and deactivation of the legacy SPS can be respectively reinterpreted (reused) to indicate activation and deactivation of initiation of transmitting a D2D signal (e.g., D2D discovery signal and/or D2D communication signal). Or, if a specific DCI format is used for a usage of notifying activation or deactivation of initiation of transmitting a D2D signal (e.g., D2D discovery signal and/or D2D communication signal) or a usage of notifying resource information related to transmission of a D2D signal (e.g., D2D discovery signal and/or D2D communication signal), it is able to configure (all or a part of) the field value configurations for indicating activation or deactivation of the legacy SPS to be redefined as an exceptional case.

In this case, as an example, if a DCI format 0, which is previously used for notifying activation/deactivation of a legacy SPS, is reused for the usage of notifying activation or (i.e., this is just an example and it may be extended to a different field), which is configured by a fixed value ('000' (i.e., refer to Table 3 to Table 5)) to notify activation/deactivation of the legacy SPS, in a manner of being redefined (reinterpreted).

As a concrete example, if the cyclic shift DM RS field is configured by a value of '001', it is considered as the DCI format 0 is used for the usage of notifying activation/deactivation of the legacy SPS (and/or legacy SPS-related resource information). On the contrary, if the cyclic shift DM RS field is configured by a value of '010', it can be configured as the DCI format 0 is used for the usage of notifying activation or deactivation of the initiation of transmitting a D2D signal (e.g., D2D discovery signal and/or D2D communication signal) or the usage of notifying the resource information related to the transmission of a D2D signal (e.g., D2D discovery signal and/or D2D communication signal).

In addition, if the specific DCI format, which is previously used for activating or deactivating the legacy SPS, is reused for the usage of notifying activation or deactivation of the initiation of transmitting a D2D signal (e.g., D2D discovery signal and/or D2D communication signal) or the usage of notifying the resource information related to the transmission of a D2D signal (e.g., D2D discovery signal and/or D2D communication signal), a part (or a combination) of fields of the DCI format, which is configured by a fixed value (i.e., refer to Table 3 to Table 5) to notify activation/deactivation of the legacy SPS, can be redefined (or reinterpreted).

Table 8 shows an example of fields for checking PDCCH/EPDCCH including a specific field for indicating SPS activation (and/or SPS activation-related resource information) (hereinafter, case A) or a specific field for indicating activation of transmission of a D2D discovery signal/D2D communication signal (and/or resource activation information related to transmission of a D2D discovery signal/D2D communication signal) (hereinafter, case B).

TABLE 8

|  | DCI format 0 | DCI format 1/1A | DCI format 2/2A/2B/2C/2D |
|---|---|---|---|
| TPC command for scheduled PUSCH | [01]: CASE #A<br>[10]: CASE #B | N/A | N/A |
| Cyclic shift DM RS | [001]: CASE #A<br>[010]: CASE #B | N/A | N/A |
| Modulation and coding scheme and redundancy version | ['MSB = 0']:<br>CASE #A, CASE #B | N/A | N/A |
| HARQ process number | N/A | <FDD><br>[001]: CASE #A<br>[010]: CASE #B<br><TDD><br>[0001]: CASE #A<br>[0010]: CASE #B | <FDD><br>[001]: CASE #A<br>[010]: CASE #B<br><TDD><br>[0001]: CASE #A<br>[0010]: CASE #B |
| Modulation and coding scheme | N/A | ['MSB = 0']:<br>CASE #A, CASE #B | For the enabled transport block:<br>['MSB = 0']:<br>CASE #A, CASE #B |
| Redundancy version | N/A | [01]: CASE #A<br>[10]: CASE #B | For the enabled transport block:<br>[01]: CASE #A<br>[10]: CASE #B | deactivation of the initiation of transmitting a D2D signal (e.g., D2D discovery signal and/or D2D communication signal) or the usage of notifying the resource information related to the transmission of a D2D signal (e.g., D2D discovery signal and/or D2D communication signal), it is able to use a cyclic shift DM RS field of the DCI format 0

Table 9 shows an example of fields for checking PDCCH/EPDCCH including a specific field for indicating SPS deactivation (and/or SPS deactivation-related resource information) (hereinafter, case A) or a specific field for indicating deactivation of transmission of a D2D discovery signal/D2D communication signal (and/or resource deactivation information related to transmission of a D2D discovery signal/D2D communication signal) (hereinafter, case #B).

TABLE 9

|  | DCI format 0 | DCI format 1A |
|---|---|---|
| TPC command for scheduled PUSCH | [01]: CASE #A<br>[10]: CASE #B | N/A |
| Cyclic shift DM RS | [001]: CASE #A<br>[010]: CASE #B | N/A |
| Modulation and coding scheme and redundancy version | [11111]:<br>CASE #A,<br>CASE #B | N/A |
| Resource block assignment and hopping resource allocation | [Set to all '1's]:<br>CASE #A,<br>CASE #B | N/A |
| HARQ process number | N/A | <FDD><br>[001]: CASE #A<br>[010]: CASE #B<br><TDD><br>[0001]: CASE #A<br>[0010]: CASE #B |
| Modulation and coding scheme | N/A | [11111]:<br>CASE #A,<br>CASE #B |
| Redundancy version | N/A | [01]: CASE #A<br>[10]: CASE #B |
| Resource block assignment | N/A | [Set to all '1's]:<br>CASE #A,<br>CASE #B |

Hence, in Table 8 and Table 9, it is able to configure a DCI format to notify whether the DCI format is used for a) the usage of activating or deactivating the legacy SPS (and/or legacy SPS-related resource information) (i.e., case #A) or b) the usage of notifying activation or deactivation of the initiation of transmitting a D2D signal (e.g., D2D discovery signal and/or D2D communication signal) or the usage of notifying the resource information related to the transmission of a D2D signal (e.g., D2D discovery signal and/or D2D communication signal) (i.e., case #B).

In this case, it is able to notify whether the specific DCI format is used for a) the usage of activating or deactivating the legacy SPS (and/or legacy SPS-related resource information) (i.e., case #A) or b) the usage of notifying activation or deactivation of the initiation of transmitting a D2D signal (e.g., D2D discovery signal and/or D2D communication signal) or the usage of notifying the resource information related to the transmission of a D2D signal (e.g., D2D discovery signal and/or D2D communication signal) (i.e., case #B) using a combination of a part of (or all) fields listed on Table 8 and Table 9 only. Or, each field listed on Table 8 and Table 9 is able to be independently used (interpreted) for notifying whether the specific DCI format is used for a) the usage of activating or deactivating the legacy SPS (and/or legacy SPS-related resource information) (i.e., case #A) or b) the usage of notifying activation or deactivation of the initiation of transmitting a D2D signal (e.g., D2D discovery signal and/or D2D communication signal) or the usage of notifying the resource information related to the transmission of a D2D signal (e.g., D2D discovery signal and/or D2D communication signal) (i.e., case #B).

In this case, according to a method of the case #B, since an amount of required bits is not that big when a simple control procedure-based D2D ProSe implementation is considered, it is able to configure (a part of, all or the rest of) values of (different or identical) predefined fields to be additionally configured by a fixed value as well as partial fields configured by a fixed value to notify activation/deactivation of a legacy SPS on a specific DCI format.

And, as an example, it is able to configure a D2D UE to detect a DCI format, which is transmitted to notify resource information related to transmission of a D2D signal (e.g., D2D discovery signal and/or D2D communication signal), and/or a DCI format, which is transmitted to notify activation or deactivation of initiation of transmitting a D2D signal (e.g., D2D discovery signal and/or D2D communication signal), based on a predefined or signaled SPS C-RNTI of the D2D UE, C-RNTI, temporary C-RNTI or D2D-RNTI newly configured or signaled for a D2D usage.

The aforementioned embodiments of the present invention (i.e., embodiment 1 to embodiment 4) can also be extensively applied to a case of reusing other DCI formats (e.g., DCI format 1B, DCI format 1C, DCI format 3, DCI format 3A and DCI format 4) instead of a specific DCI format previously used for notifying activation or deactivation of a legacy SPS or a case of using partial fields of other DCI format in a manner of being modified/aggregated/reinterpreted to notify activation or deactivation of initiation of transmitting a D2D signal (e.g., D2D discovery signal and/or D2D communication signal) or notify resource information related to transmission of a D2D signal (e.g., D2D discovery signal and/or D2D communication signal).

In the aforementioned embodiments of the present invention, a DCI format, which is transmitted to notify activation or deactivation of initiation of transmitting a D2D signal (e.g., D2D discovery signal and/or D2D communication signal), or a DCI format, which is transmitted to notify resource information related to transmission of a D2D signal (e.g., D2D discovery signal and/or D2D communication signal), can be interpreted as being transmitted by a serving base station of a D2D UE or a D2D cluster head.

And, the aforementioned embodiments of the present invention can also be extensively applied to a case that ProSe-related resources (e.g., number/position of D2D subframes) are dynamically re-changed through a predefined physical layer channel (e.g., PDCCH, (E)PDCCH, PDSCH) or a higher layer signal.

Moreover, the aforementioned embodiments of the present invention can also be extensively applied to a case that all D2D UEs participating in D2D ProSe perform D2D communication at the outside of network coverage (D2D communication outside network coverage (for public safety only)).

And, in the aforementioned embodiments of the present invention, the remaining bits except i) bits used for notifying activation or deactivation of initiation of transmitting a D2D signal (e.g., D2D discovery signal and/or D2D communication signal) ii) bits configured by a fixed value to notify activation or deactivation of initiation of transmitting a D2D signal (e.g., D2D discovery signal and/or D2D communication signal), iii) bits used for notifying resource information (e.g., discovery resource unit index (or position) information, discovery subframe index (or position) information, etc. related to transmission of a D2D signal (e.g., D2D discovery signal and/or D2D communication signal), iv) bits configured by a fixed value to notify activation/deactivation of a legacy SPS among total bits on a specific DCI format can be configured to be padded by a predefined value (i.e., 0) or reserved.

The aforementioned embodiments of the present invention (i.e., at least one of the embodiment 1 to the embodiment 4) can be configured to be restrictively applied to a predefined situation only. For example, it is able to configure the aforementioned embodiments to be restrictively applied to at least one case selected from the group consisting of i) a case that a D2D ProSe mode is configured, ii) a case that both an SPS mode and the D2D ProSe are configured at the same time, iii) a case that a specific service type (e.g., a public safety-related D2D service, a commercial D2D service, a groupcast D2D service, a unicast D2D service, a broadcast D2D service, a multicast D2D service, etc.) of D2D ProSe is performed, iv) a case that a D2D discovery operation is performed, v) a case that a D2D communication operation is performed, vi) a case that a decoding operation of a D2D discovery signal is performed, vii) a case that a decoding operation of a D2D communication data is performed, viii) a case that a D2D UE is aware of identification information of interested D2D UEs, and ix) a case that a D2D UE is not aware of identification information of interested D2D UEs.

Moreover, since the aforementioned embodiments are able to be included as one of methods of implementing the present invention, it is apparent that the embodiments are capable of being regarded as a sort of proposed schemes. Each of the aforementioned proposed schemes can be independently implemented and can be implemented in a manner of being combined (aggregated) with each other.

Moreover, the aforementioned embodiments of the present invention can be extensively applied to a case that D2D ProSe is performed under environment to which a carrier aggregation (CA) scheme is applied.

And, a D2D UE can receive information on rules/configurations of the embodiments of the present invention, information on whether to apply the rules/configurations and the like through a predefined signal (e.g., a physical layer or a higher layer signal).

And, as an example, it may be able to configure the aforementioned embodiments of the present invention to be restrictively applied only when a specific D2D UE is aware of DS transmission resource positions of interested D2D UEs and/or when a specific D2D UE is not aware of DS transmission resource positions of interested D2D UEs. In this case, when the specific D2D UE is aware of the DS transmission resource positions of the interested D2D UEs or the specific D2D UE is not aware of the DS transmission resource positions of the interested D2D UEs, it may corresponds to one selected from the group consisting of i) a case that the specific D2D UE is aware of identifiers of the interested D2D UEs and becomes aware of the DS transmission resource positions of the interested D2D UEs through a predefined function (e.g., a DS transmission resource position of a D2D UE is defined by a function of a UE identifier), ii) a case that the specific D2D UE is aware of the identifiers of the interested D2D UEs in a manner that a DS transmission resource position of a D2D UE is affected by other elements (or parameters) except an identifier of the D2D UE but the specific D2D UE is not aware of the DS transmission resource positions of the interested D2D UEs and iii) a case that the specific D2D UE is not aware of the identifiers of the interested D2D UEs but a discovery application designed in advance informs the specific D2D UE of D2D UEs near the specific D2D UE in a manner of appropriately discovering and summarizing the D2D UEs near the specific D2D UE.

In addition, the proposed methods can be extensively applied to a case that a discovery procedure is defined as "A Discovery Procedure Where Resources for Discovery Signal Transmission Are Allocated on A Non-UE Specific Basis (e.g., Resources Can Be for All UEs or Group of UEs)" or "A Discovery Procedure Where Resources for Discovery Signal Transmission Are Allocated on A Per UE Specific Basis (e.g., Resources Are Allocated for Each Specific Transmission Instance of Discovery Signals or Resources Are Semi-Persistently Allocated for Discovery Signal Transmission)".

And, the aforementioned embodiments of the present invention can also be extensively applied to a case that a D2D UE detects discovery signals of interested D2D UEs only (i.e., closed discovery procedure) or a case that a D2D UE detects all discovery signals of other D2D UEs capable of being detected irrespective of whether or not the D2D UE is interested in the DSs of other D2D UEs (i.e., open discovery procedure.

Figure 11:
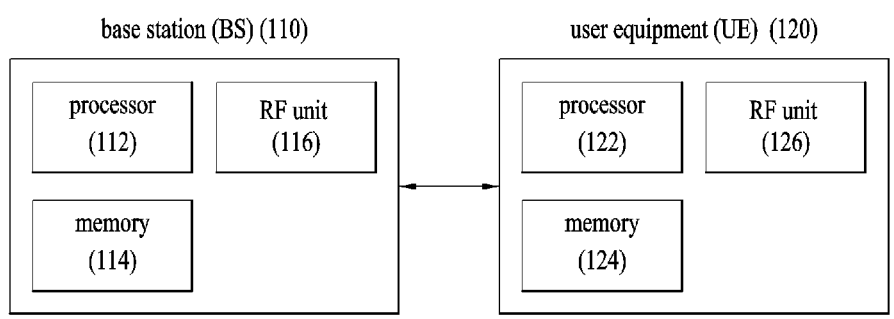
FIG. 11 is a diagram for a base station and a user equipment capable of being applied to an embodiment of the present invention.

FIG. 11 is a diagram for a base station and a user equipment capable of being applied to an embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 11, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the method of transmitting and receiving control information for D2D (device-to-device) communication in a wireless communication system and an apparatus therefor are described centering on examples applied to 3GPP LTE system, it may be applicable to various wireless communication systems as well as to the 3GPP LTE system.

What is claimed is:

1. A method of receiving control information, which is received by a user equipment (UE) for a device-to-device (D2D) proximity service (ProSe) in a wireless communication system, the method comprising:
   receiving information on radio resources semi-statically configured for the D2D ProSe; and
   receiving a downlink control information (DCI) for indicating whether to activate the D2D ProSe on a specific radio resource among the radio resources,
   wherein the DCI is valid in a discovery procedure to which a resource for UE-specifically transmitting a discovery signal is allocated,
   wherein whether to activate the D2D ProSe is indicated using a resource block assignment field of a DCI format used for determining whether to activate semi-persistent scheduling, and
   wherein a size of the resource block assignment field is determined according to a system bandwidth.

2. The method of claim 1, wherein a length of a DCI format associated with the downlink control information corresponds to a length equal to or less than a predetermined length.

3. The method of claim 1, wherein a length of a DCI format associated with the downlink control information is determined according to a bandwidth configured for the D2D ProSe.

4. The method of claim 1, wherein the specific radio resource is indicated by an index of a D2D resource unit using the resource block assignment field.

5. The method of claim 1, wherein the resource block assignment field is configured by first bits and second bits,
   wherein the first bits are used for indicating an index of a D2D resource unit, and
   wherein the second bits are used for indicating a D2D discovery subframe.

6. The method of claim 1, wherein either a procedure of transmitting and receiving a D2D discovery signal or a procedure of transmitting and receiving a D2D communication signal is determined according to a position of the specific radio resource.

7. The method of claim 1, wherein whether to activate the D2D ProSe is indicated by redefining a specific field among fields of the DCI format used for determining whether to activate the semi-persistent scheduling.

8. A user equipment (UE) for receiving control information for a device-to-device (D2D) proximity service (ProSe) in a wireless communication system, the UE comprising:
   a transceiver; and
   a processor configured to:
      control the transceiver to receive information on radio resources semi-statically configured for the D2D ProSe, and
      control the transceiver to receive a downlink control information (DCI) for indicating whether to activate the D2D ProSe on a specific radio resource among the radio resources,
   wherein the DCI is valid in a discovery procedure to which a resource for UE-specifically transmitting a discovery signal is allocated,
   wherein whether to activate the D2D ProSe is indicated using a resource block assignment field of a DCI format used for determining whether to activate semi-persistent scheduling, and
   wherein a size of the resource block assignment field is determined according to a system bandwidth.

* * * * *